United States Patent
Asaine

(10) Patent No.: US 8,211,545 B2
(45) Date of Patent: *Jul. 3, 2012

(54) HEAT CONDUCTIVE CURED PRODUCT AND MAKING METHOD

(75) Inventor: Masaya Asaine, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 891 days.

This patent is subject to a terminal disclaimer.

(21) Appl. No.: 12/044,590

(22) Filed: Mar. 7, 2008

(65) Prior Publication Data

US 2008/0254247 A1    Oct. 16, 2008

(30) Foreign Application Priority Data

Apr. 10, 2007   (JP) ................. 2007-102677

(51) Int. Cl.
*B32B 9/04*   (2006.01)

(52) U.S. Cl. ........................................ 428/447

(58) Field of Classification Search .................. 428/447
See application file for complete search history.

(56) References Cited

U.S. PATENT DOCUMENTS

| | | | | |
|---|---|---|---|---|
| 5,061,559 A * | 10/1991 | Ogusi et al. | ............... | 428/343 |
| 6,884,314 B2 * | 4/2005 | Cross et al. | ............... | 156/329 |
| 2004/0043229 A1 * | 3/2004 | Aoki et al. | ............... | 428/446 |
| 2006/0154087 A1 | 7/2006 | Asaine | | |

FOREIGN PATENT DOCUMENTS

| | | |
|---|---|---|
| JP | 59-084953 | 5/1984 |
| JP | 2000-026733 | 1/2000 |
| JP | 2003-080640 | 3/2003 |
| JP | 2005-35264 | 2/2005 |
| JP | 2005-206733 | 8/2005 |
| JP | 2006-182888 | 7/2006 |
| JP | 2006-188610 | 7/2006 |

OTHER PUBLICATIONS

Japanese Office Action dated Sep. 14, 2011 in corresponding Japanese Application JP2007-102677.

* cited by examiner

*Primary Examiner* — Margaret Moore

(74) *Attorney, Agent, or Firm* — Oblon, Spivak, McClelland, Maier & Neustadt, L.L.P.

(57) ABSTRACT

A silicone rubber composition comprises (a) an organopolysiloxane having alkenyl radicals, (b) a heat conductive filler, (c) an organohydrogenpolysiloxane, (d) a platinum group metal compound, (e) a reaction regulator, and (f) a silicone resin. A heat conductive cured product is prepared by intimately mixing components (a) to (f), applying the composition as a thin film to a substrate which has been treated to be releasable, and curing the composition.

8 Claims, No Drawings

HEAT CONDUCTIVE CURED PRODUCT AND MAKING METHOD

CROSS-REFERENCE TO RELATED APPLICATION

This non-provisional application claims priority under 35 U.S.C. §119 (a) on Patent Application No. 2007-102677 filed in Japan on Apr. 10, 2007, the entire contents of which are hereby incorporated by reference.

TECHNICAL FIELD

This invention relates to a heat conductive cured product adapted to be inserted between a thermal boundary of a heat-generating component and a heat dissipating member (e.g., heat sink or circuit board) for cooling the heat-generating component, and a method for preparing the cured product.

BACKGROUND ART

LSI chips such as CPU, driver IC and memories and light-emitting devices such as LED are used in electronic equipment such as personal computers, DVD units, and mobile phones. As these electronic components are tailored for higher performance, higher speed of operation, size reduction and higher integration, they themselves generate greater amounts of heat. Elevated temperatures of the components by their own heat cause malfunction and failure to the components themselves. To suppress a temperature rise of components during operation, many heat-dissipating means and heat-dissipating members used therefore have been proposed.

In prior art electronic equipment, heat-dissipating members, typically heat sinks in the form of metal plates of aluminum or copper having a high heat conductivity are used for suppressing a temperature rise of components during operation. The heat-dissipating member conducts the heat generated by the electronic component to its surface and releases the heat from the surface due to a temperature difference between the surface and the ambient air.

For efficient conduction of the heat generated by the component to the heat-dissipating member, it is effective to fill a small gap between the component and the member with a heat conductive material. Heat conductive sheets and heat conductive grease having heat conductive fillers laden are used as the heat conductive material. Such a heat conductive material is interposed between the electronic component and the heat-dissipating member, thereby establishing a way for heat conduction from the component to the heat-dissipating member via the heat conductive material.

Since sheets are easier to handle than grease, heat conductive sheets made of heat conductive silicone rubber or the like are used in a variety of applications. The heat conductive sheets are generally divided into two categories, general-purpose sheets which are selected for ease of handling and low-hardness sheets which are selected for adhesion.

Of these, the general-purpose sheets are, for the most part, made of hard rubbers having a hardness of at least 60 in Type A Durometer hardness unit. Even sheets in thin-film form as thin as about 0.1 mm can be handled individually, but are difficult to attach to components or heat-dissipating members because they lack surface tack. One solution to this problem is a surface-tackified sheet. Specifically, a pressure-sensitive adhesive is applied to one or both surfaces of a thin heat-conductive sheet so that it may be readily attached to a component or member. However, since the pressure-sensitive adhesive applied is not fully heat conductive, the pressure-sensitive adhesive-coated sheet has a significantly increased thermal resistance as compared with the uncoated sheet. In addition, the coating of pressure-sensitive adhesive becomes a buildup of sheet thickness and also adversely affects the thermal resistance from this aspect.

On the other hand, the low-hardness sheets are formed from low-hardness heat-conductive materials having a hardness of up to 60 in Asker C hardness unit. These sheets inherently have a sufficient degree of tack to attach them to any object without a need for pressure-sensitive adhesive or the like. However, since the low hardness is accomplished by loading the material with a large amount of plasticizer or effecting crosslinking only to a low or moderate degree, a sheet formed from the material into a thin film form lacks strength and handling. The sheet must have a thickness above a certain level in order to facilitate handling. It is then difficult to reduce the thermal resistance of low-hardness sheets. In addition, the low-hardness sheets have an undesired tendency of oil bleeding to contaminate neighboring components.

The references relating to the present invention include JP-A 2005-035264, JP-A 2005-206733, JP-A 2006-182888, and JP-A 2006-188610.

DISCLOSURE OF THE INVENTION

An object of the invention is to provide a heat conductive cured product which is easy to handle even in a single layer or thin film form, and has a sufficient tack to attach it to any electronic component or heat-dissipating member; and a method for preparing the same.

The inventors have found that a heat conductive cured product is obtained by compounding a heat-conductive filler in a silicone rubber composition of the addition reaction cure type, compounding a silicone resin therein, applying the composition as a thin film to a substrate which has been surface treated with a non-dimethyl silicone to be releasable, and curing the composition; that the heat conductive cured product has excellent surface tack, controlled bleeding, easy peeling from the substrate, and ease of handling after peeling, so that when interposed between a heat-generating component and a heat-dissipating member, it serves as an effective heat transfer member for conducting the heat from the heat-generating component to the heat-dissipating member.

In one aspect, the invention provides a heat conductive cured product prepared by applying a composition as a thin film to a substrate which has been treated to have a silicone pressure-sensitive adhesive releasable surface, and curing the composition. The composition comprises as essential components,
(a) 100 parts by weight of an organopolysiloxane having alkenyl radicals,
(b) 200 to 2,000 parts by weight of a heat conductive filler,
(c) an organohydrogenpolysiloxane in an amount to give a molar ratio of silicon-bonded hydrogen atoms in component (c) to alkenyl radicals in component (a) between 0.5/1 and 5.0/1,
(d) 0.1 to 1,000 ppm of platinum group element based on component (a) of a platinum group metal compound,
(e) an amount of a reaction regulator, and
(f) 50 to 300 parts by weight of a silicone resin.

In a preferred embodiment, the silicone resin (f) comprises $R_3SiO_{1/2}$ units and $SiO_{4/2}$ units in a molar ratio between 0.5/1 and 1.5/1 wherein R is a substituted or unsubstituted monovalent hydrocarbon radical free of aliphatic unsaturation. The heat conductive filler (b) is typically selected from metals, oxides, and nitrides. Also preferably, the substrate has been treated to be silicone pressure-sensitive adhesive releasable with a modified silicone having fluorinated substituent radicals within its main chain.

In another aspect, the invention provides a method for preparing a heat conductive cured product, comprising the steps of intimately mixing components (a) to (f), defined above, to form a composition, applying the composition as a thin film to a substrate which has been treated with a non-dimethylsilicone agent to be releasable, and curing the composition. In an alternative embodiment, a heat conductive cured product is prepared by the steps of intimately mixing a base mixture of components (a), (b), and (d) with a curing agent consisting of components (c) and (e) and with component (f) to form a composition, applying the composition as a thin film to a substrate which has been treated with a non-dimethylsilicone agent to be releasable, and curing the composition.

BENEFITS OF THE INVENTION

The heat conductive cured product of the invention is readily peelable from the substrate, is easy to handle even in a single layer or thin film form, and has a sufficient tack to attach and secure it to a heat-generating component or heat-dissipating member.

DESCRIPTION OF THE PREFERRED EMBODIMENT

The silicone rubber composition from which the heat conductive cured product of the invention is prepared contains as essential components, (a) an organopolysiloxane having alkenyl radicals, (b) a heat conductive filler, (c) an organohydrogenpolysiloxane, (d) a platinum group metal compound, (e) a reaction regulator, and (f) a silicone resin. These components are described below in detail.

Component (a) is an organopolysiloxane having alkenyl radicals, specifically an organopolysiloxane having at least two alkenyl radicals in the molecular chain, and preferably an organopolysiloxane whose main chain is essentially composed of recurring diorganosiloxane units.

Examples of component (a) include those of the average structural formulae (1) to (3).

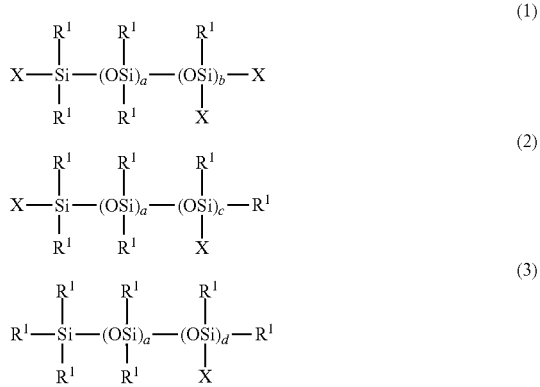

Herein $R^1$ is each independently a substituted or unsubstituted monovalent hydrocarbon radical free of aliphatic unsaturation, X is an alkenyl radical, "a" and "b" are each 0 or a positive number of at least 1, "c" is a positive number of at least 1, and "d" is a positive number of at least 2.

$R^1$ stands for a substituted or unsubstituted monovalent hydrocarbon radical free of aliphatic unsaturation, examples of which are those of 1 to 10 carbon atoms, and preferably 1 to 6 carbon atoms, including alkyl radicals such as methyl, ethyl, propyl, isopropyl, butyl, isobutyl, tert-butyl, pentyl, neopentyl, hexyl, heptyl, octyl, nonyl, decyl and dodecyl, cycloalkyl radicals such as cyclopentyl, cyclohexyl and cycloheptyl, aryl radicals such as phenyl, tolyl, xylyl, naphthyl and biphenylyl, aralkyl radicals such as benzyl, phenylethyl, phenylpropyl and methylbenzyl, and substituted forms of the foregoing in which some or all carbon-bonded hydrogen atoms are substituted by halogen atoms such as fluorine, chlorine or bromine, cyano radicals or the like, e.g., chloromethyl, 2-bromoethyl, 3-chloropropyl, 3,3,3-trifluoropropyl, chlorophenyl, fluorophenyl, cyanoethyl, and 3,3,4,4,5,5,6,6,6-nonafluorohexyl. Of these, preference is given to substituted or unsubstituted alkyl radicals of 1 to 3 carbon atoms such as methyl, ethyl, propyl, chloromethyl, bromoethyl, 3,3,3-trifluoropropyl, and cyanoethyl, and substituted or unsubstituted phenyl radicals such as phenyl, chlorophenyl and fluorophenyl. All $R^1$ may be identical or different. Most often, methyl radicals are selected for all $R^1$ for several reasons including cost, availability, chemical stability and environmental load unless special properties like solvent resistance are required.

X stands for an alkenyl radical, examples of which are those of about 2 to about 8 carbon atoms including vinyl, allyl, propenyl, isopropenyl, butenyl, hexenyl, and cyclohexenyl. Inter alia, lower alkenyl radicals such as vinyl and allyl are preferred, with vinyl being most preferred.

The subscript "a" is 0 or a positive number of at least 1, preferably a positive number satisfying $10 \leq a \leq 10,000$, more preferably $50 \leq a \leq 2,000$, and even more preferably $100 \leq a \leq 1,000$. The subscript "b" is 0 or a positive number of at least 1, preferably satisfying $0 \leq b/(a+b) \leq 0.5$, and more preferably $0 \leq b/(a+b) \leq 0.1$. The subscript "c" is a positive number of at least 1, preferably satisfying $0 < c/(a+c) \leq 0.5$, and more preferably $0 < c/(a+c) \leq 0.1$. The subscript "d" is a positive number of at least 2, preferably satisfying $0 < d/(a+d) \leq 0.5$, and more preferably $0 < d/(a+d) \leq 0.1$.

These organopolysiloxanes may be used alone or in a mixture of two or more siloxanes having different viscosity.

Component (b) is a heat conductive filler. Use may be made of materials generally known as the heat conductive filler, including metals such as non-magnetic copper and aluminum, metal oxides such as alumina, silica, magnesia, red iron oxide, beryllia, titania, and zirconia, metal nitrides such as aluminum nitride, silicon nitride, and boron nitride, synthetic diamond, and silicon carbide.

The heat conductive filler used herein is typically particulate and has an average particle size of 0.1 to 100 μm, desirably 0.5 to 50 μm, and more desirably 0.5 to 30 μm. The filler may be used alone or in a mixture of two or more species. It is acceptable to use a mixture of two or more powders having different average particle sizes. It is noted that the "average particle size" is a volume average particle size as measured by a particle size distribution analyzer Microtrac® MT3300EX (Nikkiso Co., Ltd.).

The heat conductive filler is compounded in an amount of 200 to 2,000 parts, and preferably 300 to 1,500 parts by weight per 100 parts by weight of component (a). Outside the range, a composition containing a larger amount of filler is less flowable and difficult to form whereas a composition containing a less amount of filler has a less than desired heat conductivity.

Component (c) is an organohydrogenpolysiloxane having at least two silicon-bonded hydrogen atoms (i.e., Si—H radicals) in the molecular chain and preferably at least three Si—H radicals.

Examples of the organohydrogenpolysiloxane include those of the average structural formulae (4) to (6).

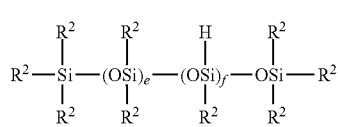

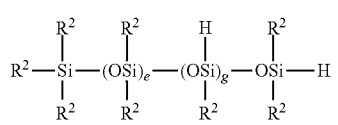

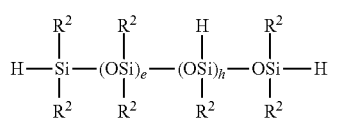

Herein $R^2$ is each independently a substituted or unsubstituted monovalent hydrocarbon radical free of aliphatic unsaturation, e and h are each 0 or a positive number of at least 1, g is a positive number of at least 1, and f is a positive number of at least 2.

In formulae (4) to (6), $R^2$ stands for a substituted or unsubstituted monovalent hydrocarbon radical free of aliphatic unsaturation, examples of which are those of 1 to 10 carbon atoms, and preferably 1 to 6 carbon atoms, including alkyl radicals such as methyl, ethyl, propyl, isopropyl, butyl, isobutyl, tert-butyl, pentyl, neopentyl, hexyl, heptyl, octyl, nonyl, decyl and dodecyl, cycloalkyl radicals such as cyclopentyl, cyclohexyl and cycloheptyl, aryl radicals such as phenyl, tolyl, xylyl, naphthyl and biphenylyl, aralkyl radicals such as benzyl, phenylethyl, phenylpropyl and methylbenzyl, and substituted forms of the foregoing in which some or all carbon-bonded hydrogen atoms are substituted by halogen atoms such as fluorine, chlorine or bromine, cyano radicals or the like, e.g., chloromethyl, 2-bromoethyl, 3-chloropropyl, 3,3,3-trifluoropropyl, chlorophenyl, fluorophenyl, cyanoethyl, and 3,3,4,4,5,5,6,6,6-nonafluorohexyl. Of these, preference is given to substituted or unsubstituted alkyl radicals of 1 to 3 carbon atoms such as methyl, ethyl, propyl, chloromethyl, bromoethyl, 3,3,3-trifluoropropyl, and cyanoethyl, and substituted or unsubstituted phenyl radicals such as phenyl, chlorophenyl and fluorophenyl. All $R^2$ may be identical or different. Desirably, $R^2$ is the same substituent radical as $R^1$.

Like $R^1$, methyl radicals are most often selected for all $R^2$ for several reasons including cost, availability, chemical stability and environmental load unless special properties like solvent resistance are required.

The subscript "e" is 0 or a positive number of at least 1, preferably a positive number from 0 to 500, and more preferably from 5 to 100. The subscript "f" is a positive number of at least 2, preferably from 2 to 100, and more preferably from 2 to 50. The subscript "g" is a positive number of at least 1, preferably from 1 to 100, and more preferably from 1 to 50. The subscript "h" is 0 or a positive number of at least 1, preferably from 0 to 100, and more preferably from 0 to 50.

Component (c) is added in an amount to give 0.5 to 5.0 moles of Si—H radicals in component (c) per mole of alkenyl radicals in component (a). Preferably component (c) is added in an amount to give 0.8 to 4.0 moles and more preferably 1.0 to 3.0 moles of Si—H radicals per mole of alkenyl radicals. If the amount of Si—H radicals in component (c) is less than 0.5 mole per mole of alkenyl radicals in component (a), a sheet formed from the composition may remain under-cured or have an insufficient strength to handle as a part. If the amount of Si—H radicals is more than 5.0 moles, a sheet formed from the composition has an insufficient tack to secure itself in place by its own adhesiveness.

Component (d) is a platinum group metal compound or platinum group metal based curing catalyst. This catalyst promotes the addition reaction between alkenyl radicals in component (a) and Si—H radicals in component (c) and includes a number of well-known catalysts for use in hydrosilylation reaction. Exemplary catalysts include platinum group metals such as platinum (inclusive of platinum black), rhodium, and palladium; platinum chlorides, chloroplatinic acid and chloroplatinic acid salts such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$, and $Na_2HPtCl_4 \cdot nH_2O$ wherein n is an integer of 0 to 6, and preferably 0 or 6; alcohol-modified chloroplatinic acid, complexes of chloroplatinic acid with olefins; platinum group metals such as platinum black and palladium on supports such as alumina, silica and carbon; rhodium-olefin complexes, chlorotris(triphenylphosphine)rhodium (known as Wilkinson catalyst); and complexes of platinum chlorides, chloroplatinic acid and chloroplatinic acid salts with vinyl-containing siloxanes.

Component (d) may be used in a catalytic amount, and specifically in an amount to give 0.1 to 1,000 ppm, desirably 0.5 to 200 ppm, and more desirably 1.0 to 100 ppm of platinum group metal element based on the weight of component (a).

Component (e) is a reaction regulator which serves to regulate the rate of reaction between components (a) and (c) in the presence of component (d).

Exemplary of the reaction regulator are acetylene alcohol compounds, amine compounds, phosphorus compounds, and sulfur compounds, with the acetylene alcohol compounds being preferred. The reaction regulator may be added in any desired amount as long as the reaction can be controlled to the desired rate, and preferably in an amount of 0.01 to 2.0 parts by weight per 100 parts by weight of component (a).

Component (f) is a silicone resin which is added to impart tack to the cured product.

Typically the silicone resin is a copolymer of $R_3SiO_{1/2}$ units (known as M units) and $SiO_{4/2}$ units (known as Q units). The molar ratio of M units to Q units, M/Q, is in the range between 0.5 and 1.5, preferably between 0.6 and 1.4, and more preferably 0.7 and 1.3. If M/Q is less than 0.5 or more than 1.5, then the desired tack may not be achieved.

Herein R is a substituted or unsubstituted monovalent hydrocarbon radical free of aliphatic unsaturation, examples of which are those of 1 to 10 carbon atoms, and preferably 1 to 6 carbon atoms, including alkyl radicals such as methyl, ethyl, propyl, isopropyl, butyl, isobutyl, tert-butyl, pentyl, neopentyl, hexyl, heptyl, octyl, nonyl, decyl and dodecyl, cycloalkyl radicals such as cyclopentyl, cyclohexyl and cycloheptyl, aryl radicals such as phenyl, tolyl, xylyl, naphthyl and biphenylyl, aralkyl radicals such as benzyl, phenylethyl, phenylpropyl and methylbenzyl, and substituted forms of the foregoing in which some or all carbon-bonded hydrogen atoms are substituted by halogen atoms such as fluorine, chlorine or bromine, cyano radicals or the like, e.g., chloromethyl, 2-bromoethyl, 3-chloropropyl, 3,3,3-trifluoropropyl, chlorophenyl, fluorophenyl, cyanoethyl, and 3,3,4,4,5,5,6,6, 6-nonafluorohexyl. Of these, preference is given to substituted or unsubstituted alkyl radicals of 1 to 3 carbon atoms such as methyl, ethyl, propyl, chloromethyl, bromoethyl, 3,3,3-trifluoropropyl, and cyanoethyl, and substituted or unsubstituted phenyl radicals such as phenyl, chlorophenyl and fluorophenyl. All R may be identical or different. Desirably, R is the same substituent radical as $R^1$.

Like $R^1$, methyl radicals are most often selected for all R for several reasons including cost, availability, chemical stability and environmental load unless special properties like solvent resistance are required.

Component (f) is added in an amount of 50 to 300 parts, preferably 60 to 200 parts, and more preferably 70 to 150 parts by weight per 100 parts by weight of component (a). If the amount of component (f) is less than 50 phr or more than 300 phr, the desired tack is not achievable.

Although component (f) itself is a solid or viscous liquid at room temperature, it may be used as a solution in a solvent. On use of the solution, the amount of component (f) added is calculated from the amount excluding the solvent.

To the composition, various additives for improving various functions, for example, surface treating agents for the heat conductive filler, pigments and dyes for coloration, and flame retardants may be added as long as they do not adversely affect the objects of the invention.

A heat conductive cured product can be prepared by intimately mixing the foregoing components to form a silicone rubber composition, applying the composition onto a substrate as a thin film, and heat curing the coating.

The coating preferably has a thickness of 20 to 1,000 μm and more preferably 30 to 500 μm. If the coating thickness is less than 20 μm, it may lack ease of handling and tack. If the coating thickness is more than 1,000 μm, the desired heat conductivity may not be obtained.

To facilitate application of the silicone rubber composition, a solvent such as toluene may be added to the composition for viscosity adjustment.

The substrate onto which the silicone rubber composition is to be applied is typically a paper sheet or PET film which has been surface treated with a non-dimethylsilicone polymer to be releasable. By the surface treatment, the substrate is provided with a releasable surface so that any coating applied to the substrate surface may be subsequently peeled from the substrate surface. Examples of the non-dimethylsilicone polymer used herein include modified silicones having fluorinated substituent radicals such as perfluoroalkyl or perfluoropolyether radicals on the main chain. The perfluoropolyether radicals have the following formulae (7) to (9).

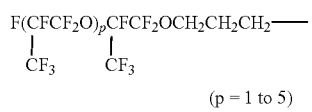

(7)

(p = 1 to 5)

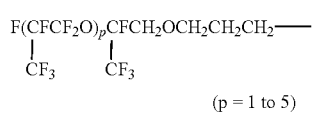

(8)

(p = 1 to 5)

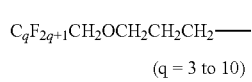

(9)

(q = 3 to 10)

Suitable modified silicones having fluorinated substituent radicals are commercially available under the trade name of X-70-201 and X-70-258 from Shin-Etsu Chemical Co., Ltd.

In applying the composition onto a substrate, a suitable applicator such as a bar coater, knife coater, comma coater or spin coater may be used to apply the liquid material onto the substrate. The application technique is not limited thereto.

Heating conditions after application are not particularly limited as long as heating reaches a temperature at which the solvent, if used, volatilizes off and a reaction between components (a) and (c) takes place. From the productivity aspect, the temperature is desirably 60 to 150° C., and more desirably 80 to 150° C. The cure reaction is slow at temperatures lower than 60° C., detracting from productivity, whereas the film used as the substrate may deform at temperatures above 150° C. The curing time is usually 0.5 to 30 minutes, and preferably 1 to 20 minutes.

The heat conductive cured product is ready for use. Alternatively, another film which has been treated to be releasable like the substrate film may be attached to the other surface of the heat conductive cured product remote from the substrate as a separator film, so that the resulting assembly is easy to handle during subsequent transportation and cutting in lengths. For both the substrate film and separator film, the type and amount of release agent applied to film and the type of film may be changed so that these films may differ in peeling force.

On use, the separator film or substrate film is peeled, the heat conductive cured product is attached to a heat-generating component or heat-dissipating member, and then the remaining film is peeled. Even though the cured product is a thin film, it can be readily attached in place and provide for effective heat conduction.

EXAMPLE

Examples of the invention are given below by way of illustration and not by way of limitation. All percents (%) are by weight.

Example 1

A universal agitator (Shinagawa model) was charged with 100 g of vinyl end-capped dimethylpolysiloxane having a viscosity of 600 $mm^2/s$ and 600 g of alumina having an average particle size of 10 μm (DAW-10 by Denki Kagaku Kogyo K.K.) whereupon they were mixed for 60 minutes. This was followed by addition of 0.2 g of 2% chloroplatinic acid in 2-ethylhexanol, intimate mixing, addition of 0.2 g of 50% ethynylcyclohexanol in toluene, further intimate mixing, addition of 5 g of an organohydrogenpolysiloxane having the average structural formula (10), shown below, and 166 g of a toluene solution of silicone resin (nonvolatile content 60%, molar ratio M/Q=1.15), and final intimate mixing. A composition "a" was obtained. To a PET film of 100 μm thick which had been coated with 1.0 $g/m^2$ of a release agent X-70-201 (Shin-Etsu Chemical Co., Ltd.), composition "a" was applied in such a buildup as to give a dry thickness of 0.1 mm, air dried at room temperature for 10 minutes, then held in an atmosphere at 100° C. for 10 minutes for curing, yielding a cured product "A" of 0.1 mm thick.

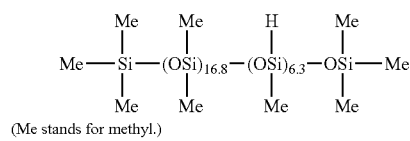

(Me stands for methyl.)

Comparative Example 1

A universal agitator (Shinagawa model) was charged with 100 g of vinyl end-capped dimethylpolysiloxane having a viscosity of 600 mm$^2$/s, 100 g of methyl end-capped dimethylpolysiloxane having a viscosity of 100 mm$^2$/s, and 600 g of alumina having an average particle size of 10 µm (DAW-10 by Denki Kagaku Kogyo K.K.) whereupon they were mixed for 60 minutes. This was followed by addition of 0.2 g of 2% chloroplatinic acid in 2-ethylhexanol, intimate mixing, addition of 0.2 g of 50% ethynylcyclohexanol in toluene, further intimate mixing, addition of 5 g of an organohydrogenpolysiloxane having the average structural formula (10) and 66 g of toluene, and final intimate mixing. A composition "b" was obtained. To a PET film of 100 µm thick which had been coated with 1.0 g/m$^2$ of a release agent X-70-201 (Shin-Etsu Chemical Co., Ltd.), composition "b" was applied in such a buildup as to give a dry thickness of 0.1 mm, air dried at room temperature for 10 minutes, then held in an atmosphere at 100° C. for 10 minutes for curing, yielding a cured product "B" of 0.1 mm thick.

Comparative Example 2

A universal agitator (Shinagawa model) was charged with 200 g of vinyl end-capped dimethylpolysiloxane having a viscosity of 600 mm$^2$/s and 600 g of alumina having an average particle size of 10 µm (DAW-10 by Denki Kagaku Kogyo K.K.) whereupon they were mixed for 60 minutes. This was followed by addition of 0.2 g of 2% chloroplatinic acid in 2-ethylhexanol, intimate mixing, addition of 0.2 g of 50% ethynylcyclohexanol in toluene, further intimate mixing, addition of 5 g of an organohydrogenpolysiloxane having the average structural formula (10) and 66 g of toluene, and final intimate mixing. A composition "c" was obtained. To a PET film of 100 µm thick which had been coated with 1.0 g/m$^2$ of a release agent X-70-201 (Shin-Etsu Chemical Co., Ltd.), composition "c" was applied in such a buildup as to give a dry thickness of 0.1 mm, air dried at room temperature for 10 minutes, then held in an atmosphere at 100° C. for 10 minutes for curing, yielding a cured product "C" of 0.1 mm thick.

Comparative Example 3

A universal agitator (Shinagawa model) was charged with 200 g of vinyl end-capped dimethylpolysiloxane having a viscosity of 600 mm$^2$/s and 600 g of alumina having an average particle size of 10 µm (DAW-10 by Denki Kagaku Kogyo K.K.) whereupon they were mixed for 60 minutes. This was followed by addition of 0.2 g of 2% chloroplatinic acid in 2-ethylhexanol, intimate mixing, addition of 0.2 g of 50% ethynylcyclohexanol in toluene, further intimate mixing, addition of 3.5 g of an organohydrogenpolysiloxane having the average structural formula (10) and 66 g of toluene, and final intimate mixing. A composition "d" was obtained. To a PET film of 100 µm thick which had been coated with 1.0 g/m$^2$ of a release agent X-70-201 (Shin-Etsu Chemical Co., Ltd.), composition "d" was applied in such a buildup as to give a dry thickness of 0.1 mm, air dried at room temperature for 10 minutes, then held in an atmosphere at 100° C. for 10 minutes for curing, yielding a cured product "D" of 0.1 mm thick.

Comparative Example 4

A universal agitator (Shinagawa model) was charged with 100 g of vinyl end-capped dimethylpolysiloxane having a viscosity of 600 mm$^2$/s, 100 g of methyl end-capped dimethylpolysiloxane having a viscosity of 100 mm$^2$/s, and 600 g of alumina having an average particle size of 10 µm (DAW-10 by Denki Kagaku Kogyo K.K.) whereupon they were mixed for 60 minutes. This was followed by addition of 0.2 g of 2% chloroplatinic acid in 2-ethylhexanol, intimate mixing, addition of 0.2 g of 50% ethynylcyclohexanol in toluene, further intimate mixing, addition of 5 g of an organohydrogenpolysiloxane having the average structural formula (10), and final intimate mixing. A composition "e" was obtained. To a PET film of 100 µm thick which had been coated with 1.0 g/m$^2$ of a release agent X-70-201 (Shin-Etsu Chemical Co., Ltd.), composition "e" was applied in such a buildup as to give a dry thickness of 0.1 mm and 0.5 mm and held in an atmosphere at 100° C. for 10 minutes for curing, yielding cured products "E1" and "E2" of 0.1 mm and 0.5 mm thick, respectively.

Comparative Example 5

A universal agitator (Shinagawa model) was charged with 200 g of vinyl end-capped dimethylpolysiloxane having a viscosity of 600 mm$^2$/s and 600 g of alumina having an average particle size of 10 µm (DAW-10 by Denki Kagaku Kogyo K.K.) whereupon they were mixed for 60 minutes. This was followed by addition of 0.2 g of 2% chloroplatinic acid in 2-ethylhexanol, intimate mixing, addition of 0.2 g of 50% ethynylcyclohexanol in toluene, further intimate mixing, addition of 5 g of an organohydrogenpolysiloxane having the average structural formula (10), and final intimate mixing. A composition "f" was obtained. To a PET film of 100 µm thick which had been coated with 1.0 g/m$^2$ of a release agent X-70-201 (Shin-Etsu Chemical Co., Ltd.), composition "f" was applied in such a buildup as to give a dry thickness of 0.1 mm and 0.5 mm and held in an atmosphere at 100° C. for 10 minutes for curing, yielding cured products "F1" and "F2" of 0.1 mm and 0.5 mm thick, respectively.

Comparative Example 6

A universal agitator (Shinagawa model) was charged with 200 g of vinyl end-capped dimethylpolysiloxane having a viscosity of 600 mm$^2$/s and 600 g of alumina having an average particle size of 10 µm (DAW-10 by Denki Kagaku Kogyo K.K.) whereupon they were mixed for 60 minutes. This was followed by addition of 0.2 g of 2% chloroplatinic acid in 2-ethylhexanol, intimate mixing, addition of 0.2 g of 50% ethynylcyclohexanol in toluene, further intimate mixing, addition of 3.5 g of an organohydrogenpolysiloxane having the average structural formula (10), and final intimate mixing. A composition "g" was obtained. To a PET film of 100 µm thick which had been coated with 1.0 g/m$^2$ of a release agent X-70-201 (Shin-Etsu Chemical Co., Ltd.), composition "g" was applied in such a buildup as to give a dry thickness of 0.1 mm and 0.5 mm and held in an atmosphere at 100° C. for 10 minutes for curing, yielding cured products "G1" and "G2" of 0.1 mm and 0.5 mm thick, respectively.

Comparative Example 7

Composition "a" in Example 1 was applied to a PET film of 100 μm thick in such a buildup as to give a dry thickness of 0.1 mm, air dried at room temperature for 10 minutes, then held in an atmosphere at 100° C. for 10 minutes for curing, yielding a cured product "H" of 0.1 mm thick.

Comparative Example 8

Composition "a" in Example 1 was applied to a PET film 75-V0 (Nippa Co., Ltd.) in such a buildup as to give a dry thickness of 0.1 mm, air dried at room temperature for 10 minutes, then held in an atmosphere at 100° C. for 10 minutes for curing, yielding a cured product "I" of 0.1 mm thick.

The cured products "A" to "I" were tested for surface tack, bleeding, peel from the substrate, handling after peeling, and thermal resistance. The results are shown in Table 1.

"Bleeding" was examined by cutting a 0.1-mm thick sample together with a substrate into a piece of 20 mm square, resting the piece on wood-free paper with the resin layer facing the paper, placing a weight of 100 g thereon for pressure contact, and allowing to stand one day. The degree of migration of oil to the paper was visually inspected.

"Peel" was examined by a manual touch test. The operator evaluated a peeling force required to manually peel the heat conductive cured product from the substrate film.

"Handling after peeling" was rated by examining how a separate heat conductive cured product after peeling could be manually handled while visually inspecting the shape thereof.

Thermal resistance was determined by sandwiching the cured product between a TO-3P type transistor heater and a heat sink, placing a load of 300 gf (=29 kPa) on the sandwich, applying an electric power across the heater, measuring the temperatures of the heater and heat sink, and computing according to the following equation.

Thermal resistance=(heater temp.−heat sink temp.)/applied power

TABLE 1

| | Sample | Thickness (mm) | Surface tack | Bleeding | Peel | Handling after peeling | Thermal resistance (° C./W) |
|---|---|---|---|---|---|---|---|
| Example 1 | Cured product A | 0.1 | Tacky | Nil | Light | Good | 0.40 |
| Comparative Example 1 | Cured product B | 0.1 | Nil | Slight | Light | Brittle and breakable | — |
| 2 | Cured product C | 0.1 | Nil | Nil | Light | Brittle and breakable | — |
| 3 | Cured product D | 0.1 | Tacky | Tremendous | Heavy | Stretched, difficult to retain shape | — |
| 4 | Cured product E1 | 0.1 | Nil | Slight | Light | Brittle and breakable | — |
| | Cured product E2 | 0.5 | Nil | — | Light | Good | 1.00 |
| 5 | Cured product F1 | 0.1 | Nil | Nil | Light | Brittle and breakable | — |
| | Cured product F2 | 0.5 | Nil | — | Light | Good | 0.97 |
| 6 | Cured product G1 | 0.1 | Tacky | Tremendous | Heavy | Stretched, difficult to retain shape | — |
| | Cured product G2 | 0.5 | Tacky | — | Heavy | Good | 1.09 |
| 7 | Cured product H | 0.1 | Tacky | Nil | Extremely heavy | — | — |
| 8 | Cured product I | 0.1 | Tacky | Nil | Kept bonded | — | — |

Japanese Patent Application No. 2007-102677 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A heat-dissipating member comprising a substrate which has been surface treated with a modified silicone having a fluorinated substituent radical selected from the group consisting of perfluoroalkyl radicals and perfluoropolyether radicals on the main chain, and a heat conductive cured product prepared by curing a composition comprising:
- (a) 100 parts by weight of an organopolysiloxane having alkenyl radicals,
- (b) 200 to 2,000 parts by weight of a heat conductive filler,
- (c) an organohydrogenpolysiloxane in an amount to give a molar ratio of silicon-bonded hydrogen atoms in component (c) to alkenyl radicals in component (a) between 0.5/1 and 5.0/1,
- (d) 0.1 to 1,000 ppm of platinum group element based on component (a) of a platinum group metal compound,
- (e) an amount of a reaction regulator, and
- (f) 50 to 300 parts by weight of a silicone resin comprising $R_3SiO_{1/2}$ units and $SiO_{4/2}$ units in a molar ratio between 0.5/1 and 1.5/1, wherein R is an substituted or unsubstituted monovalent hydrocarbon radical free of aliphatic unsaturation, said heat conductive cured product being laminated on said substrate so that the member is releasable from the substrate, and said heat conductive cured product released from the substrate being interposed between a heat-generating component and a heat-dissipating member, and wherein another film which has been treated to be releasable is attached to the other surface of the heat conductive cured product remote from the substrate as a separator film.

2. The heat-dissipating member of claim 1, wherein the perfluoropolyether radical has any of the of the following formulae (7) to (9):

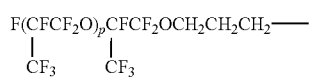

(7)

(p= 1 to 5)

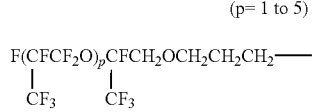

(8)

(p= 1 to 5)

(9)

(q= 3 to 10)

3. The heat-dissipating member of claim 1, wherein the substrate is a paper sheet or PET film.

4. The heat-dissipating member of claim 1, wherein the heat conductive filler (b) is selected from the group consisting of metals, oxides, and nitrides.

5. A method for preparing a heat-dissipating member comprising the steps of intimately mixing components (a) to (f) to form a composition, applying the composition as a thin film to a substrate which has been surface treated with a modified silicone having a fluorinated substituent radical selected from the group consisting of perfluoroalkyl radicals and perfluoropolyether radicals on the main chain to be releasable, and curing the composition to form a heat conductive cured product to be interposed between a heat-generating component and a heat-dissipating member, said components (a) to (f) being:
- (a) 100 parts by weight of an organopolysiloxane having alkenyl radicals,
- (b) 200 to 2,000 parts by weight of a heat conductive filler,
- (c) an organohydrogenpolysiloxane in an amount to give a molar ratio of silicon-bonded hydrogen atoms in component (c) to alkenyl radicals in component (a) between 0.5/1 and 5.0/1,
- (d) 0.1 to 1,000 ppm of platinum group element based on component (a) of a platinum group metal compound,
- (e) an amount of a reaction regulator, and
- (f) 50 to 300 parts by weight of a silicone resin comprising $R_3SiO_{1/2}$ units and $SiO_{4/2}$ units in a molar ratio between 0.5/1 and 1.5/1, wherein R is an substituted or unsubstituted monovalent hydrocarbon radical free of aliphatic unsaturation, and wherein another film which has been treated to be releasable is attached to the other surface of the heat conductive cured product remote from the substrate as a separator film.

6. The method of claim 5, wherein the perfluoropolyether radical has any of the of the following formulae (7) to (9):

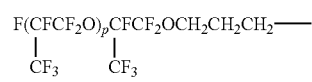

(7)

(p= 1 to 5)

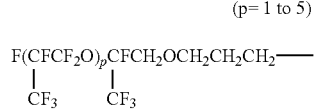

(8)

(p= 1 to 5)

(9)

(q= 3 to 10)

7. The method of claim 5, wherein the substrate is a paper sheet or PET film.

8. The method of claim 5, wherein the heat conductive filler (b) is selected from the group consisting of metals, oxides, and nitrides.

* * * * *